(12) United States Patent
Qiu

(10) Patent No.: US 8,629,837 B2
(45) Date of Patent: Jan. 14, 2014

(54) METHOD AND DEVICE FOR CONTROLLING INFORMATION DISPLAY OUTPUT AND INPUT DEVICE

(76) Inventor: Bo Qiu, Jiangsu (CN)

( * ) Notice: Subject to any disclaimer, the term of this patent is extended or adjusted under 35 U.S.C. 154(b) by 940 days.

(21) Appl. No.: 12/255,145

(22) Filed: Oct. 21, 2008

(65) Prior Publication Data

US 2009/0040177 A1 Feb. 12, 2009

Related U.S. Application Data

(63) Continuation of application No. PCT/CN2007/001332, filed on Apr. 23, 2007.

(51) Int. Cl.
*G06F 3/033* (2013.01)
*G09G 5/08* (2006.01)

(52) U.S. Cl.
USPC .......... 345/163; 715/764; 715/765; 345/156; 345/157

(58) Field of Classification Search
USPC ............................ 345/156–184; 715/700–866
See application file for complete search history.

(56) References Cited

U.S. PATENT DOCUMENTS

| | | | |
|---|---|---|---|
| 5,815,830 A * | 9/1998 | Anthony | 707/758 |
| 5,973,686 A * | 10/1999 | Shimogori | 715/746 |
| 5,990,890 A * | 11/1999 | Etheredge | 715/808 |
| 6,636,853 B1 * | 10/2003 | Stephens, Jr. | 1/1 |
| 7,165,223 B2 * | 1/2007 | Kutaragi et al. | 715/745 |
| 2002/0118176 A1 * | 8/2002 | Ribak | 345/169 |
| 2003/0052920 A1 * | 3/2003 | Carter | 345/764 |
| 2006/0019717 A1 | 1/2006 | Gong | |

FOREIGN PATENT DOCUMENTS

| | | |
|---|---|---|
| CN | 1113020 A | 12/1995 |
| CN | 1356610 A | 7/2002 |

OTHER PUBLICATIONS

International Search Report—PCT/CN2007/001332.

* cited by examiner

*Primary Examiner* — Gene W Lee
(74) *Attorney, Agent, or Firm* — Alan Kamrath; Kamrath IP LAWFIRM, PA

(57) ABSTRACT

A method and device for controlling information display output and an input device. wherein the method and device control the display output of pages or files based on the pressure parameter information, the electromagnetic parameter information, the energy parameter information and/or the time parameter information input by the user. Therefore, the method and device can quickly locate the position needed to be displayed in a plurality of displayed pages, and can multi-dimensionally arbitrarily move or select the displayed position, pages or files, etc., at one time. Furthermore, the method and device can also quickly, flexibly, accurately change the currently displayed position.

6 Claims, 3 Drawing Sheets

METHOD AND DEVICE FOR CONTROLLING INFORMATION DISPLAY OUTPUT AND INPUT DEVICE

This application is a continuation of International Application No. PCT/CN2007/001332 filed on Apr. 23, 2007, which claims the priority to Chinese Application No. 200610046372.3 filed on Apr. 21, 2006. The entire contents of the two applications are incorporated herein by reference.

TECHNICAL FIELD

The present invention relates to the field of computer technologies, and in particular, to a technology for controlling display output.

BACKGROUND OF THE INVENTION

In computer devices, friendly and convenient Human Computer Interaction/Interface (HCI) and User Interface (UI) functions, which are one of the critical technologies for implementing the computer devices, need to be provided.

With the rapid development of the computer technologies, various display technologies have been increasingly applied, especially in the industries of computer, communication, etc. Although the displays have become much larger than before, peoples like larger viewable screens or would like to take full use of smaller display space. Especially in various human computer interaction/interface devices, such as desktop computers, laptop computers, palm computers, mobile phones, Personal Digital Assistants (PDAs), Personal Information Managers (PIMs), tablet Personal Computers (tablet PCs), whiteboards and electronic whiteboards, and digital, electronic and other display devices, larger display space is needed.

In digital, electronic and other display devices using a window system, when office software, drawing software (for example, photoshop, view, ACDSee, etc.), adobe or the like is being used, various files can be moved in two dimensions within the window of the display device. In the process of the two-dimensional movement, however, the associated operations are relatively troublesome due to the limitation in the functions of the device. Therefore, multi-dimensional movement can not be implemented.

In addition, when there are multiple separate display units to be displayed, the user can not select a display unit designated by the display output flexibly and promptly.

In summary, the following problems remain in the human computer interaction/interface environment and digital, electronic and other display devices:

1) a part needed to be displayed can not be determined in a short time when there are many different display pages;

2) a part, page or file to be displayed can not be moved freely in multiple dimensions and selected; and 3) a currently displayed part can not be changed rapidly, accurately and flexibly.

In view of the above, implementations of the present invention make the applications of the display processing devices more flexible and convenient, and enable more rapid, convenient, flexible and space-saving multi-dimensional movement and fast selection of candidates in the process of controlling display and input, thereby providing the users of the display processing devices with better visual experience and larger viewable space.

SUMMARY OF THE INVENTION

The present invention provides a method and device for controlling information display output and an input device, to simplify the operation procedures in the process of controlling display output and improve the efficiency in the process of controlling display output.

A method for information display output includes pre-establishing a correspondence relationship between pressure parameter information, electromagnetic quantity parameter information, energy parameter information and/or time parameter information and movement parameter information, the movement parameter information being used for controlling a movement amount of display information, the process of controlling information display including:

acquiring inputted pressure parameter information, electromagnetic quantity parameter information, energy parameter information and/or time parameter information;

determining movement parameter information of current display information according to the pressure parameter information, electromagnetic quantity parameter information, energy parameter information and/or time parameter information; and moving the current display information according to the movement parameter information of the current display information, and outputting the moved display information.

Optionally, the method further includes:

displaying relative position relationship information between the currently outputted display information and entire display information which includes the currently outputted display information while the display information is being outputted, according to the movement parameter information of the current display information.

Optionally, the movement parameter information includes: a movement distance and a movement direction in a one-dimensional or multi-dimensional display environment.

Optionally, the process of acquiring inputted pressure parameter information, electromagnetic quantity parameter information, energy parameter information and/or time parameter information includes:

when determining that pressure parameter information, electromagnetic quantity parameter information, energy parameter information and/or time parameter information needs to be inputted according to an inputted button parameter, acquiring pressure parameter information, electromagnetic quantity parameter information, energy parameter information and/or time parameter information inputted through an input device.

A device for controlling information display output includes:

a correspondence relationship storing element, adapted to store a pre-established correspondence relationship between pressure parameter information, electromagnetic quantity parameter information, energy parameter information and/or time parameter information and movement parameter information, the movement parameter information being used for controlling a movement amount of display information;

a movement parameter determining element, adapted to determine movement parameter information of current display information using information in the correspondence relationship storing element according to inputted pressure parameter information, electromagnetic quantity parameter information, energy parameter information and/or time parameter information; and a display information movement processing element, adapted to move the current display information according to the movement parameter information of the current display information determined by the movement parameter determining element, and outputting the moved display information.

Optionally, the device further includes:

a relative position relationship displaying element, adapted to display relative position relationship information between the currently outputted display information and entire display information which includes the currently outputted display information while the display information is being outputted, according to the movement parameter of the current display information.

A method for controlling information display output includes:

determining a display unit group to be displayed, the display unit group including a plurality of separate display units;

determining a unique distinctive variable parameter corresponding to each display unit in the display unit group, the distinctive variable parameter being pressure parameter information, electromagnetic quantity parameter information, energy parameter information and/or time parameter information; and acquiring an inputted distinctive variable parameter, determining a display unit to be displayed corresponding to the distinctive variable parameter according to the distinctive variable parameter, and displaying the display unit.

Optionally, the process of determining a unique distinctive variable parameter corresponding to each display unit in the display unit group includes:

judging whether the number of the display units included in the display unit group exceeds the total number of different pressure parameters or electromagnetic quantity parameters as distinctive variable parameters; and dividing the display unit group into a plurality of subgroups each corresponding to an information parameter of an operation button, an input device or an element of an input device, an input of a nib, a sliding of a finger on a touch screen, or a sliding of a mouse, and determining a corresponding pressure parameter or electromagnetic quantity parameter for each display unit in each subgroup, if the number of the display units included in the display unit group exceeds the total number of different pressure parameters or electromagnetic quantity parameters, or determining a corresponding pressure parameter or electromagnetic quantity parameter for a display unit or each display unit in the display unit group, if the number of the display units included in the display unit group does not exceed the total number of different pressure parameters or electromagnetic quantity parameters.

Optionally, the process of determining a unique distinctive variable parameter corresponding to each display unit in the display unit group further includes: if the number of the display units included in a subgroup still exceeds the total number of the different pressure parameters or electromagnetic quantity parameters, subdividing the subgroup, until the number of the display units included in a subgroup does not exceed the total number of the different pressure parameters or electromagnetic quantity parameters.

Optionally, the process of acquiring an inputted distinctive variable parameter includes:

if it is judged that the inputted pressure parameter or electromagnetic quantity parameter falls into a predetermined range, determining the currently inputted pressure parameter or electromagnetic quantity parameter; or determining the currently inputted pressure parameter or electromagnetic quantity parameter and a parameter of an operation button, an input device or an element of an input device, an input of a nib, a sliding of a finger on a touch screen, or a sliding of a mouse.

Optionally, the display units include separate formatted files and/or file managers.

A device for controlling information display output includes:

a display unit determining element, adapted to determine a display unit group to be displayed, the display unit group including a plurality of separate display units;

a distinctive variable parameter assigning element, adapted to determine a unique distinctive variable parameter corresponding to each display unit in the display unit group, the distinctive variable parameter being pressure parameter information, electromagnetic quantity parameter information, energy parameter information and/or time parameter information;

an inputted parameter acquiring element, adapted to acquire an inputted pressure parameter or electromagnetic quantity parameter as the distinctive variable parameter; and a display processing element, adapted to determine a display unit to be displayed corresponding to the distinctive variable parameter acquired by the inputted parameter acquiring element according to the distinctive variable parameter, and display the display unit.

Optionally, the distinctive variable parameter assigning element includes:

a judgment processing element, adapted to judge whether the number of the display units included in the display unit group exceeds the total number of different pressure parameters or electromagnetic quantity parameters as distinctive variable parameters; and a parameter assignment processing element, adapted to divide the display unit group into a plurality of subgroups each corresponding to a parameter of an operation button, an input device or an element of an input device, an input of a nib, a sliding of a finger on a touch screen, or a sliding of a mouse, and determine a corresponding pressure parameter or electromagnetic quantity parameter for each display unit in each subgroup, if the number of the display units included in the display unit group exceeds the total number of different pressure parameters or electromagnetic quantity parameters; or determine a corresponding pressure parameter or electromagnetic quantity parameter for a display unit or each display unit in the display unit group, if the number of the display units included in the display unit group does not exceed the total number of different pressure parameters or electromagnetic quantity parameters.

Optionally, the parameter assignment processing element is further adapted to, if the number of the display units included in a subgroup still exceeds the total number of the different pressure parameters or electromagnetic quantity parameters, subdivide the subgroup, until the number of the display units included in a subgroup does not exceed the total number of the different pressure parameters or electromagnetic quantity parameters.

Optionally, the inputted parameter acquiring element includes:

an inputted parameter identifying element, adapted to judge whether the inputted pressure parameter or electromagnetic quantity parameter falls into a predetermined range; and a parameter acquiring processing element, adapted to determine the currently inputted pressure parameter or electromagnetic quantity parameter, or determine the currently inputted pressure parameter or electromagnetic quantity parameter and a parameter of an operation button, an input device or an element of an input device, an input of a nib, a sliding of a finger on a touch screen, or a sliding of a mouse, if the judgment result of the inputted parameter identifying element is positive.

An input device for inputting display control information includes:

a parameter inputting element, adapted to input a pressure parameter or electromagnetic quantity parameter corresponding to movement parameter information for controlling display information or corresponding to a display unit to be displayed currently; and a parameter transmitting element, adapted to output the pressure parameter or electromagnetic quantity parameter inputted through the parameter inputting element, to control information display.

Optionally, the parameter inputting element includes a pressure sensor or an electromagnetic quantity inputting element, an operation button, an input device or an element of an input device. The parameter inputting element is provided on the input device or the element of the input device. The input device includes but is not limited to: a whiteboard, an electronic whiteboard, a keyboard, a mouse, a touch pad and/or a touch screen.

Optionally, the operation button, the element of the input device or the input device is further provided with a touch sensor adapted to input control information by touch.

It can be seen from the above solutions of the present invention, the present invention provides the following advantages:

1) a part needed to be displayed can be determined in a short time when there are many different display pages;

2) a candidate such as a part, page, file, or candidate word to be displayed can be moved freely in multiple dimensions and selected; and 3) a currently displayed part can be changed rapidly, accurately and flexibly.

DETAILED DESCRIPTION OF THE EMBODIMENTS

Figure 1:
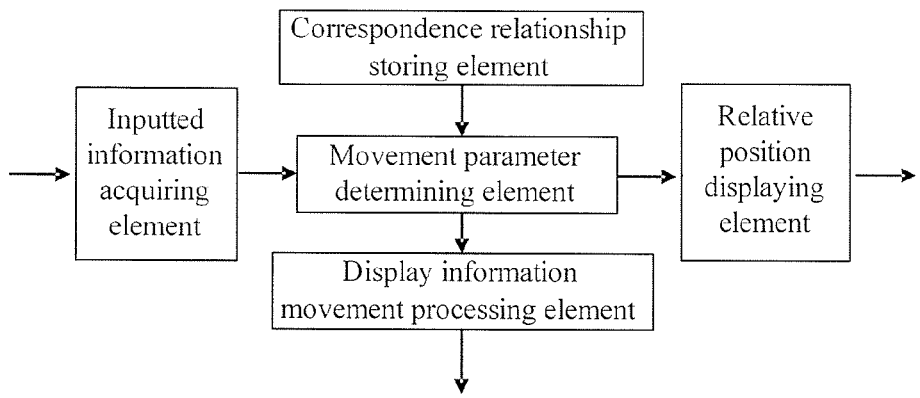
FIG. 1 is a schematic diagram illustrating the specific structure of a device according to the present invention.
Figure 2A:
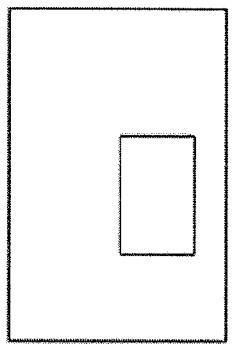
FIG. 2 is a schematic diagram illustrating relative position information displayed on a screen according to the present invention.
Figure 2B:
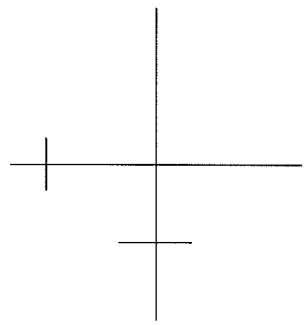
Figure 2C:
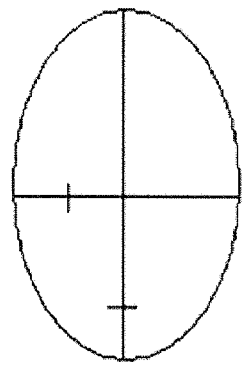
Figure 2D:
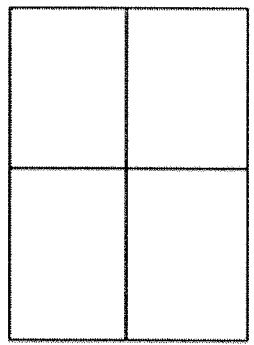
Figure 2E:
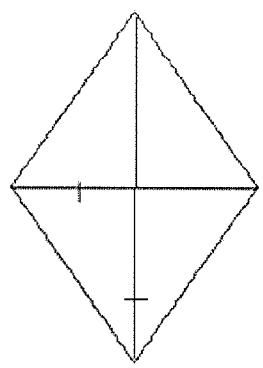
Figure 2F:
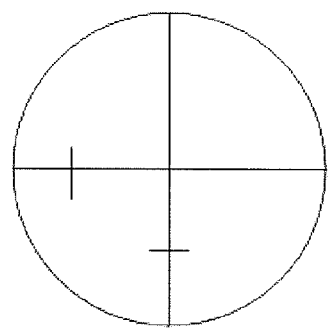
Figure 2G:
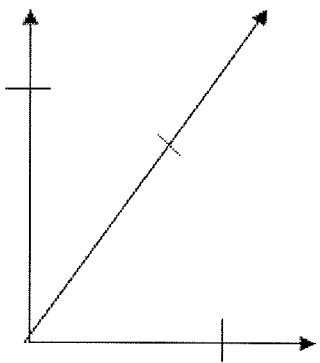
Figure 2H:
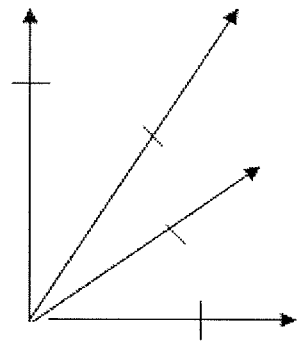

An object of the embodiments of the present invention is to provide a method and device for controlling information display output and an input device, which are more convenient, flexible, rapid and space-saving and can provide larger viewable space and multi-dimensional movement.

In a method for controlling information display output according to an embodiment of the present invention, a correspondence relationship between pressure parameter information, electromagnetic quantity parameter information, energy parameter information and/or time parameter information and movement parameter information need to be preestablished first, wherein the movement parameter information is used for controlling a movement amount of display information in each dimension, and the movement amount may include information such as a movement distance and a movement direction. Then, the corresponding process of controlling information display includes: acquiring inputted pressure parameter information, electromagnetic quantity parameter information, energy parameter information and/or time parameter information; determining movement parameter information of current display information according to the pressure parameter information or electromagnetic quantity parameter information; and moving the current display information according to the movement parameter information of the current display information, and outputting the moved display information, thereby implementing movement controlling operations for the current display information.

According to an embodiment of the present invention, relative position relationship information between the currently outputted display information and entire display information which includes the currently outputted display information may be displayed while the display information is being outputted, according to the movement parameter information of the current display information, in order for a user to obtain a relative position relationship between the currently displayed information and the entire display information.

According to an embodiment of the present invention, the movement parameter information includes: a movement distance and a movement direction in a one-dimensional or multi-dimensional display environment. In a two-dimensional environment, for example, movement distances of display information in a corresponding two-dimensional space may be determined according to a certain pressure parameter or electromagnetic quantity parameter, including particularly movement distances respectively under two-dimension coordinates in a two-dimensional plane, and the corresponding movements are performed at a time, such that one input of the pressure parameter can be used to control the display information to be moved simultaneously in multiple dimensions, thereby enabling more flexible and convenient display output control.

According to an embodiment of the present invention, in the process of acquiring inputted pressure parameter information, electromagnetic quantity parameter information, energy parameter information and/or time parameter information, whether pressure parameter information, electromagnetic quantity parameter information, energy parameter information and/or time parameter information needs to be inputted may be determined according to an inputted button parameter. When determining that pressure parameter information, electromagnetic quantity parameter information, energy parameter information and/or time parameter information needs to be inputted, pressure parameter information, electromagnetic quantity parameter information, energy parameter information and/or time parameter information inputted through an input device is acquired. For example, it may be determined that a user needs to input a pressure parameter according to the number of clicks on an operation button of a mouse, an input device or an element of an input device, and a corresponding pressure parameter may be inputted through a pressure sensor provided on the mouse.

Another embodiment of the present invention provides a device for controlling information display output, the specific structure of which is illustrated in FIG. 1, and which may include the following processing elements.

1) Correspondence Relationship Storing Element

This element may be adapted to store a preestablished correspondence relationship between pressure parameter information, electromagnetic quantity parameter information, energy parameter information and/or time parameter information and movement parameter information, the movement parameter information being used for controlling a movement amount of display information, such that movement of the display information can be controlled directly according to a pressure parameter or electromagnetic quantity parameter inputted by a user, thereby simplifying the operations.

2) Inputted Information Acquiring Element

This element may be adapted to acquire inputted pressure parameter information, electromagnetic quantity parameter information, energy parameter information and/or time parameter information. The element may be an electromagnetic quantity parameter information detecting and receiving device.

3) Movement Parameter Determining Element

This element may be adapted to determine movement parameter information of current display information using the correspondence relationship information stored in the correspondence relationship storing element according to the inputted pressure parameter information, electromagnetic quantity parameter information, energy parameter information and/or time parameter information.

4) Display information movement processing element

This element may be adapted to move the current display information according to the movement parameter information of the current display information determined by the movement parameter determining element, and outputting the moved display information, thereby implementing control of the movement of the display information by means of the inputted pressure parameter or electromagnetic quantity parameter, for example, the movement and display of a certain page.

Optionally, the device further includes a relative position relationship displaying element, adapted to display relative position relationship information between the currently outputted display information and entire display information which includes the currently outputted display information while the display information is being outputted, according to the movement parameter of the current display information.

Information displayed on a screen by the relative position relationship displaying element may be as illustrated in FIGS. 2A to 2H, which may be also called small window components (or display icons, auxiliary tools or virtual devices). The small box shown in FIG. 2A indicates the position of currently displayed display information in the entire display information, the two small short line segments shown in FIGS. 2B, 2C, 2E and 2F indicate the positions under two-dimension coordinates of currently displayed display information in the entire display information, the intersectional point of the two line segments in the box shown in FIG. 2D indicates the position of currently displayed display information in the entire display information, and the small short line segments shown in FIGS. 2G and 2H indicate the positions under three-dimension and four-dimension coordinates, respectively, of currently displayed display information in the entire display information. The display indications in FIGS. 2G and 2G may change with a change in movement parameters. That is, information about relative positions that are currently actually displayed may be displayed in real time.

The small window components may be of any shape, such as a rectangle, a square, a hexagon, an ellipse and a circle or a combination thereof, and may be displayed in any color, brightness, contrast or transparency.

Among the small window components described above, the solution of display shown in FIG. 2B can provide a user with as large display space as possible, and is a good option for a palm computer and a mobile phone.

An embodiment of the present invention provides another method for controlling information display output, which can control any display unit among a plurality of display units to be displayed rapidly, thereby improving the efficiency in the process of controlling display output by a user.

In a method for controlling information display output according to an embodiment of the present invention, a display unit or display unit group to be displayed is determined first, the display unit or display unit group including a separate display unit or a plurality of separate display units. Then, a unique distinctive variable parameter corresponding to each display unit in the display unit group is determined, the distinctive variable parameter being pressure parameter information, electromagnetic quantity parameter information, energy parameter information and/or time parameter information. Finally, an inputted distinctive variable parameter is acquired, a display unit to be displayed corresponding to the distinctive variable parameter is determined according to the distinctive variable parameter, and the display unit is displayed. The display unit may be a separate formatted file or file manager, a page, a candidate word or a candidate option, for example, a file folder or a certain type of formatted file (for example, a WORD file, a page file or the like).

According to this embodiment of the present invention, in the process of determining a unique distinctive variable parameter corresponding to each display unit in the display unit group, whether the number of the display units included in the display unit group exceeds the total number of different pressure parameters or electromagnetic quantity parameters as distinctive variable parameters is judged first. Then, if the number of the display units included in the display unit group exceeds the total number of different pressure parameters or electromagnetic quantity parameters, the display unit group is divided into a plurality of subgroups each corresponding to a parameter of an operation button, an input device or an element of an input device, and a corresponding pressure parameter or electromagnetic quantity parameter is determined for each display unit in each subgroup. Otherwise, a corresponding pressure parameter or electromagnetic quantity parameter is determined directly for each display unit in the display unit group.

The "input" used herein includes a linear or nonlinear relationship, a continuous or discontinuous quantity, or an "input device". The "input device" used herein includes a device or object that can input a linear or nonlinear relationship or a continuous or discontinuous quantity, i.e. one or more devices or objects, constituent parts or components thereof, or software used or parts, controls or buttons thereof, that can input one, or simultaneously or non-simultaneously, multiple variables, including but not limited to a mouse, an input pen, a keyboard, input gloves, input clothes, a finger or another part of a human body, a human body, an object, or a detecting or sensing device, or an object that is capable of action, vision, gesture, sign language, voice, or mechanical, physical, chemical, vital or social motion. The "identifying graphic" used herein includes a cursor and an arrow.

In the process of subgroup division, if the number of the display units included in a subgroup still exceeds the total number of the different pressure parameters or electromagnetic quantity parameters, the subgroup is subdivided, until the number of the display units included in a subgroup does not exceed the total number of the different pressure parameters or electromagnetic quantity parameters, thereby ensuring that different display units can be identified by the different pressure parameters, and control a display unit accurately to be displayed.

According to the present embodiment, in the process of acquiring an inputted distinctive variable parameter, only when it is judged that the inputted pressure parameter or electromagnetic quantity parameter falls into a predetermined range, the pressure parameter or electromagnetic quantity parameter will be acquired, i.e. the currently inputted pressure parameter or electromagnetic quantity parameter is determined; or the currently inputted pressure parameter and a parameter of an operation button, an input device or an element of an input device are determined, or the currently inputted electromagnetic quantity parameter and a parameter of an operation button, an input device or an element of an input device are determined.

An embodiment of the present invention provides a device for controlling information display output, which can control any display unit among a plurality of display units to be displayed rapidly, thereby improving the efficiency in the process of controlling display output by a user.

Figure 3:
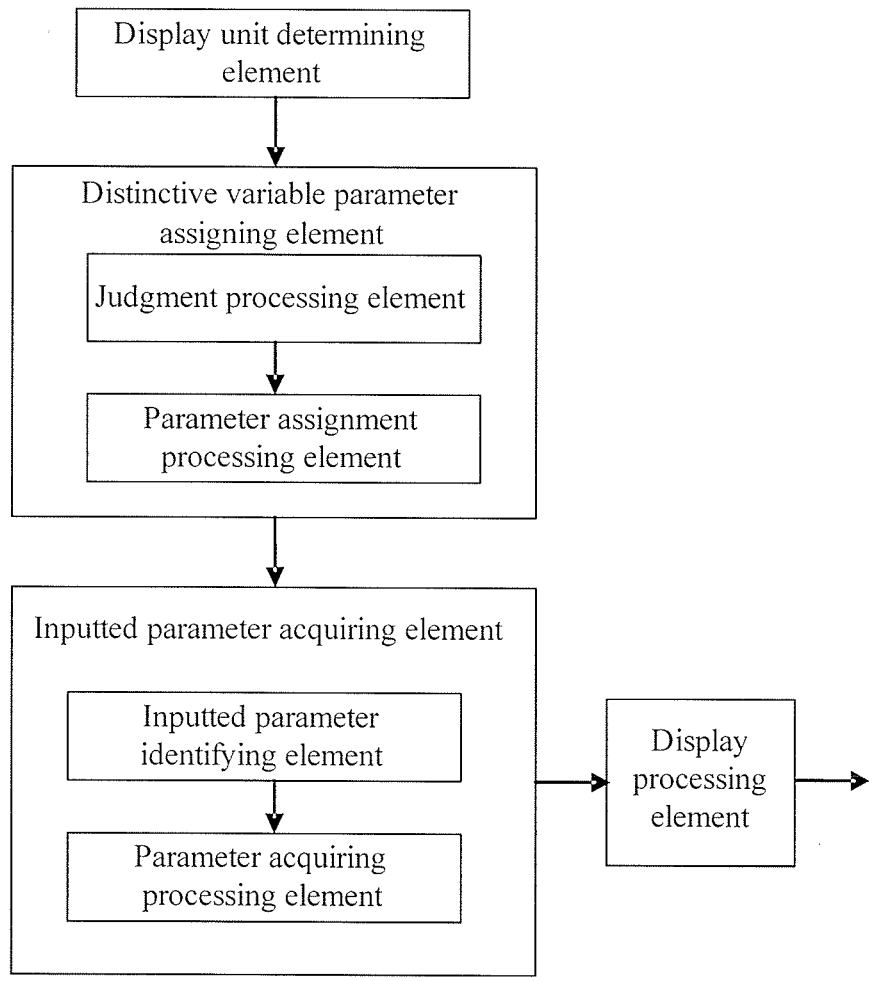
FIG. 3 is a schematic diagram illustrating the specific structure of another device according to the present invention.

The specific structure of the device is illustrated in FIG. 3 and the device may include the following processing elements.

1) Display Unit Determining Element

This element may be adapted to determine a display unit group to be displayed, the display unit group including a plurality of separate display units.

2) Distinctive Variable Parameter Assigning Element

This element may be adapted to determine a unique distinctive variable parameter corresponding to each display unit in the display unit group, the distinctive variable parameter being pressure parameter information, electromagnetic quantity parameter information, energy parameter information and/or time parameter information.

Moreover, the distinctive variable parameter assigning element may include:

a judgment processing element, adapted to judge whether the number of the display units included in the display unit group exceeds the total number of different pressure parameters or electromagnetic quantity parameters as distinctive variable parameters; and a parameter assignment processing element, adapted to divide the display unit group into a plurality of subgroups each corresponding to a parameter of an operation button, an input device or an element of an input device, and determine a corresponding pressure parameter or electromagnetic quantity parameter for each display unit in each subgroup, if the number of the display units included in the display unit group exceeds the total number of different pressure parameters or electromagnetic quantity parameters; or determine a corresponding pressure parameter or electromagnetic quantity parameter for a display unit or each display unit in the display unit group, if the number of the display units included in the display unit group does not exceed the total number of different pressure parameters or electromagnetic quantity parameters. The parameter assignment processing element is further adapted to, if the number of the display units included in a subgroup still exceeds the total number of the different pressure parameters or electromagnetic quantity parameters, subdivide the subgroup, until the number of the display units included in a subgroup does not exceed the total number of the different pressure parameters or electromagnetic quantity parameters.

3) Inputted Parameter Acquiring Element

This element may be adapted to acquire a pressure parameter or electromagnetic quantity parameter inputted by a user.

The inputted parameter acquiring element may include:

an inputted parameter identifying element, adapted to judge whether the inputted pressure parameter or electromagnetic quantity parameter falls into a predetermined range; and a parameter acquiring processing element, adapted to determine the currently inputted pressure parameter or electromagnetic quantity parameter, or determine the currently inputted pressure parameter or electromagnetic quantity parameter and a parameter of an operation button, an input device or an element of an input device, if the judgment result of the inputted parameter identifying element is positive.

4) Display Processing Element

This element may be adapted to determine a display unit to be displayed corresponding to the distinctive variable parameter acquired by the inputted parameter acquiring element according to the distinctive variable parameter, and display the display unit.

Figure 4:
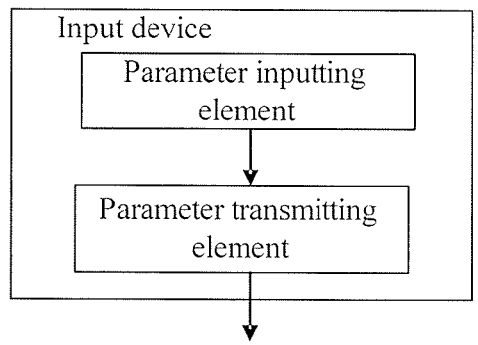
FIG. 4 is a schematic diagram illustrating the specific structure of an input device according to the present invention.

An embodiment of the present invention provides an input device for inputting display control information, by which a user can input information to control currently displayed information. The specific structure of the device is illustrated in FIG. 4, and may include the following elements.

1) Parameter Inputting Element

This element may be adapted to input a pressure parameter or electromagnetic quantity parameter corresponding to movement parameter information for controlling display information or corresponding to a display unit to be displayed currently.

The parameter inputting element may include a pressure sensor or an electromagnetic quantity inputting element, an operation button, an input device or an element of an input device. The parameter inputting element is provided on the input device, a keyboard, a mouse, a touch pad and/or a touch screen.

2) Parameter Transmitting Element

This element may be adapted to output the pressure parameter or electromagnetic quantity parameter inputted through the parameter inputting element, to control information display. Optionally, the input device, the element of the input device and/or an operation key of the keyboard may be further provided with a touch sensor adapted to input control information by touch.

For better understanding of the embodiments of the present invention, application examples of the embodiments of the present invention are described below in detail with reference to the accompanying drawings.

APPLICATION EXAMPLE 1

Figure 5:
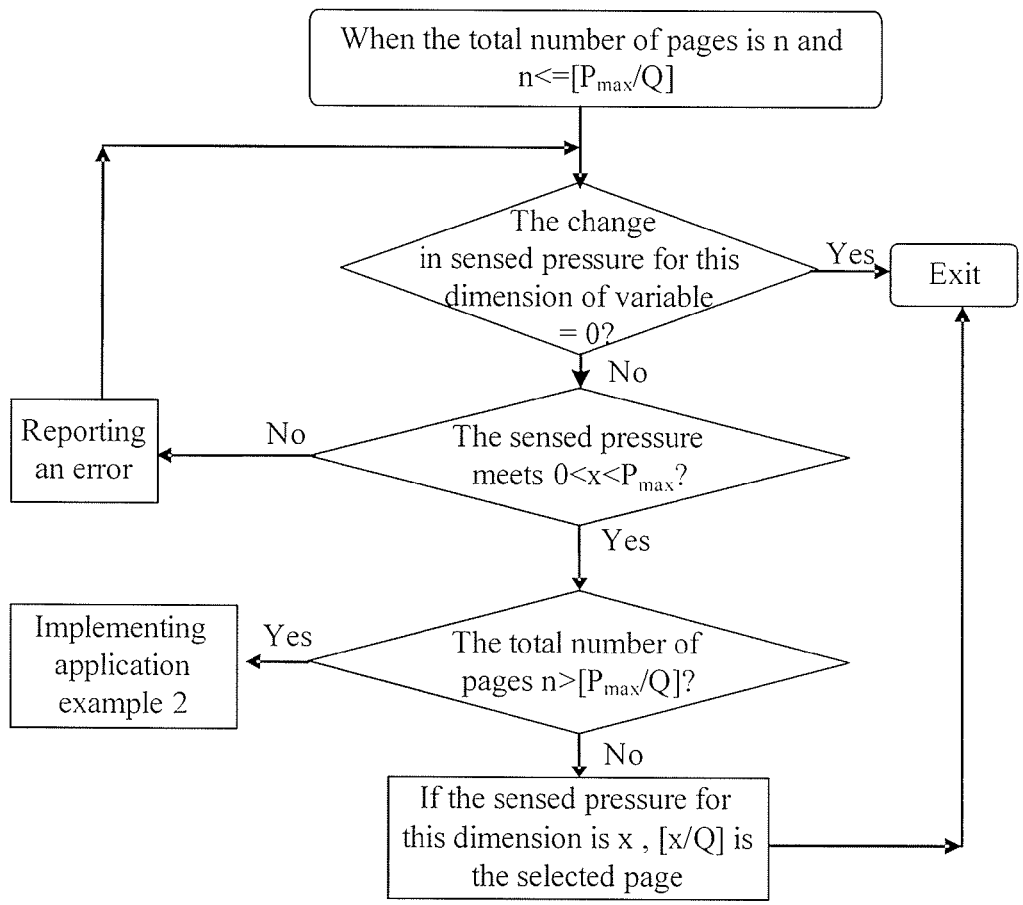
FIG. 5 is a schematic diagram illustrating a process according to an embodiment of the present invention.

In this application example as shown in FIG. 5, a mouse having an input button (or sensor) for sensing a change in pressure may be used as an input device. In the case that a browsed part of a current page is to be changed through the mouse, the process of controlling multiple pages or a part of a page to be changed in three dimensions simultaneously may include the following steps.

Step 1, judgment is made as to whether the clicked button on the mouse is a specified one and whether the number of clicks on the button meets a specified requirement. For example, if the specified button is the middle button of the mouse and the specified number of clicks is an even number, judgment is made as to whether the middle button of the mouse is clicked and if clicked, further judgment is made as to whether the number of clicks is an even number.

Step 2, if the judgment result of step 1 is positive, judgment is made as to whether the number of pages to be called and displayed is less than a value obtained by rounding up the value of the number of currently identifiable pressure levels, $P_{max}/Q$, where $P_{max}$ is a maximum applicable pressure (for example, 10 newtons), and Q is an identifiable pressure difference (i.e. a convenient and practical minimum identifiable pressure, for example, 0.1 newtons). The number of identifiable pressure levels is namely the number of different pressure parameters. If the judgment result is positive, the process proceeds to step 3. In this application example, only the case in which the judgment result is positive is described. If the judgment result is negative, application example 2 described later needs to be applied.

For example, when the number of clicks on the mouse is an even number and the total number of pages is less than the number of currently identifiable pressure levels [$P_{max}$/Q], the current coordinates of the mouse are recorded as the initial position and the currently applied pressure is sensed.

Step 3, judgment is made as to whether the sensed pressure falls into a specified range. In other words, whether the pressure x inputted through the mouse is below the specified maximum applicable pressure $P_{max}$ is judged in this application example. If the judgment result is negative, an error report is displayed to prompt the user to re-input a pressure. If the judgment result is positive, i.e. the inputted pressure falls into the specified pressure range, the page with a page number of [x/Q] is displayed.

In this application example, it is assumed that the number of identifiable levels for an inputted quantity of an input device (for example, a pressure of a pressure input pen) needs to be greater than or equal to the result of rounding up the value of $P_{max}$/Q. For example, the number of pressure levels for an input pen is 1024. The nib of the input pen and the contact portions for three fingers each are provided with a pressure sensor.

APPLICATION EXAMPLE 2

In this application example following application example 1, the total number of pages is greater than the result of rounding up the value of $P_{max}$/Q. That is, the number of different pressure parameters is less than the total number of pages for which display output needs to be controlled. Here, the page group consisting of all the pages needs to be divided into subgroups, so that the number of pages included in each subgroup is less than the number of the different pressure parameters.

In this application example 2, the corresponding process includes the following steps.

Step 1, all current pages are divided into subgroups, where the number of pages included in each subgroup is less than the number of different pressure parameters, and the number of page group levels obtained after the division is v, i.e. v levels of divisions into subgroups have been performed.

Step 2, judgment is made as to whether the value of v meets the requirement. If not, an error is reported, and step 1 is repeated. If the value of v meets the requirement, each level of subgroup is assigned to a respective level of specified press button (of one or more pressure pens), each level of pressure button is sensed for a pressure, a page group or page corresponding to the pressure on each level of pressure button is calculated, and a page to be displayed is calculated according to the page groups or pages corresponding to the pressures on all levels of the pressure buttons and is displayed.

From the above two applications examples, it can be seen that for a file group for which display output needs to be controlled, these application examples can be also applied, so long as the respective files are regarded as respective pages, so that a designated file out of the file group can be displayed conveniently and rapidly.

With the above solutions, a user may select and locate any file promptly from all files to be displayed (when there are any number of the files) and select and locate any page promptly from the selected file, as desired. Moreover, the above solutions may be also applied to operations with respect to a virtual space. Specifically, a virtual space group may be selected from all virtual spaces, a virtual space may be selected from a virtual space group, a plane group may be selected from a virtual space, and a plane may be selected from a plane group, so that a virtual space group, a virtual space, a plane group or a plane that is to be displayed can be determined from all the virtual spaces to be displayed with the above solutions by sensing pressures on all buttons simultaneously.

In summary, the embodiments of the present invention provide solutions that can change a currently displayed part and a displayed file, page, or file manager rapidly, flexibly and accurately.

While the present invention has been illustrated and described with reference to some preferred embodiments, the present invention is not limited thereto. Various variations or substitutions can be made by those skilled in the art without departing from the disclosed scope of the present invention and thus come into the scope of protection for the present invention. Therefore, the scope of protection for the present invention shall be defined by the accompanying claims.

The invention claimed is:

1. A method of controlling multiple pages or a part of a page to be changed in three dimensions simultaneously, wherein the method is controlled through a mouse having an input button or sensor for sensing a change in pressure to change a browsed part of a current page, the method comprising:

step 1: judging whether a clicked button on the mouse is a specified one and whether the number of clicks on the button meets a specified requirement;

step 2: if the judgment result of step 1 is positive, judging whether number of pages to be called and displayed is less than a value obtained by rounding up a value of the number of currently identifiable pressure levels, $P_{max}$/Q, wherein $P_{max}$ is a maximum applicable pressure, Q is an identifiable pressure difference, and the number of identifiable pressure levels is namely the number of different pressure parameters; and if the judgment result is positive, the process proceeds to step 3; and step 3, judging whether a sensed pressure x inputted through the mouse is below a specified maximum applicable pressure $P_{max}$, if the judgment result is negative, an error report is displayed to prompt a user to re-input a pressure, if the judgment result is positive, a page with a page number of x/Q is displayed.

2. The method according to claim 1, wherein the maximum applicable pressure comprises 10 newtons.

3. The method according to claim 1, if the specified button is a middle button of the mouse and the specified number of clicks is an even number, a judgment is made as to whether the middle button of the mouse is clicked and if clicked, further judgment is made as to whether the number of clicks is an even number.

4. The method according to claim 1, when the number of clicks on the mouse is an even number and the total number of pages is less than the number of currently identifiable pressure levels $P_{max}$/Q, current coordinates of the mouse are recorded as an initial position and currently applied pressure is sensed.

5. The method according to claim 1, wherein the identifiable pressure difference comprises 0.1 newtons.

6. The method according to claim 1, when the judgment result in step 2 is negative, the method further comprises the following steps:

step i: dividing all current pages into subgroups, wherein the number of pages included in each subgroup is less than the number of different pressure parameters, the number of page group levels obtained after division is v, and v levels of divisions into subgroups have been performed;

step ii: judging whether the value of v meets a requirement, if not, an error is reported, and step i is repeated; if the value of v meets the requirement, each level of subgroup is assigned to a respective level of specified press button, each level of pressure button is sensed for a pressure, a page group or page corresponding to the pressure on each level of pressure button is calculated, and a page to be displayed is calculated according to the page groups or pages corresponding to the pressures on all levels of the pressure buttons and is displayed.

\* \* \* \* \*